United States Patent
Shiobara et al.

(10) Patent No.: US 7,333,269 B2
(45) Date of Patent: Feb. 19, 2008

(54) DISPLAY DEVICE FOR VEHICLES

(75) Inventors: Hiroshi Shiobara, Niigata (JP); Keiichi Nagano, Niigata (JP)

(73) Assignee: Nippon Seiko Co., Ltd., Niigata (JP)

( * ) Notice: Subject to any disclaimer, the term of this patent is extended or adjusted under 35 U.S.C. 154(b) by 216 days.

(21) Appl. No.: 10/525,845

(22) PCT Filed: Mar. 31, 2003

(86) PCT No.: PCT/JP03/04149

§ 371 (c)(1),
(2), (4) Date: Feb. 25, 2005

(87) PCT Pub. No.: WO2004/022377

PCT Pub. Date: Mar. 18, 2004

(65) Prior Publication Data

US 2006/0291066 A1    Dec. 28, 2006

(30) Foreign Application Priority Data

Aug. 30, 2002    (JP) ............................ 2002-252378

(51) Int. Cl.
*G02B 27/14* (2006.01)
*G09G 5/00* (2006.01)
(52) U.S. Cl. ......................................... 359/630; 345/7
(58) Field of Classification Search ........ 359/630–632; 345/7–9

See application file for complete search history.

(56) References Cited

U.S. PATENT DOCUMENTS

| 5,334,995 | A | 8/1994 | Iino |
| 5,394,203 | A | 2/1995 | Murphy et al. |
| 5,457,575 | A | 10/1995 | Groves et al. |
| 5,553,328 | A * | 9/1996 | Hall et al. .................. 359/632 |
| 6,504,518 | B1 * | 1/2003 | Kuwayama et al. ........... 345/7 |
| 6,813,086 | B2 * | 11/2004 | Bignolles et al. ........... 359/630 |

FOREIGN PATENT DOCUMENTS

| JP | 2000-137189 | 5/2000 |
| JP | 2001-097073 | 4/2001 |

\* cited by examiner

*Primary Examiner*—Alicia M Harrington
(74) *Attorney, Agent, or Firm*—McDermott Will & Emery LLP

(57) ABSTRACT

A display device (display unit) for vehicles has a display element emitting display light. It has a reflecting member (reflecting mirror) for reflecting the display light. It has a drive means for angularly moving the reflecting member at a first speed at ordinary times or at a second speed greater than the first speed. When an ignition switch is turned off, the drive means angularly moves the reflecting member to an angular position where the sunlight is not reflected by the display element and when the ignition switch is turned on, it angularly moves the reflecting member to an original position where the display light is visible at the second speed.

7 Claims, 7 Drawing Sheets

F I G. 3
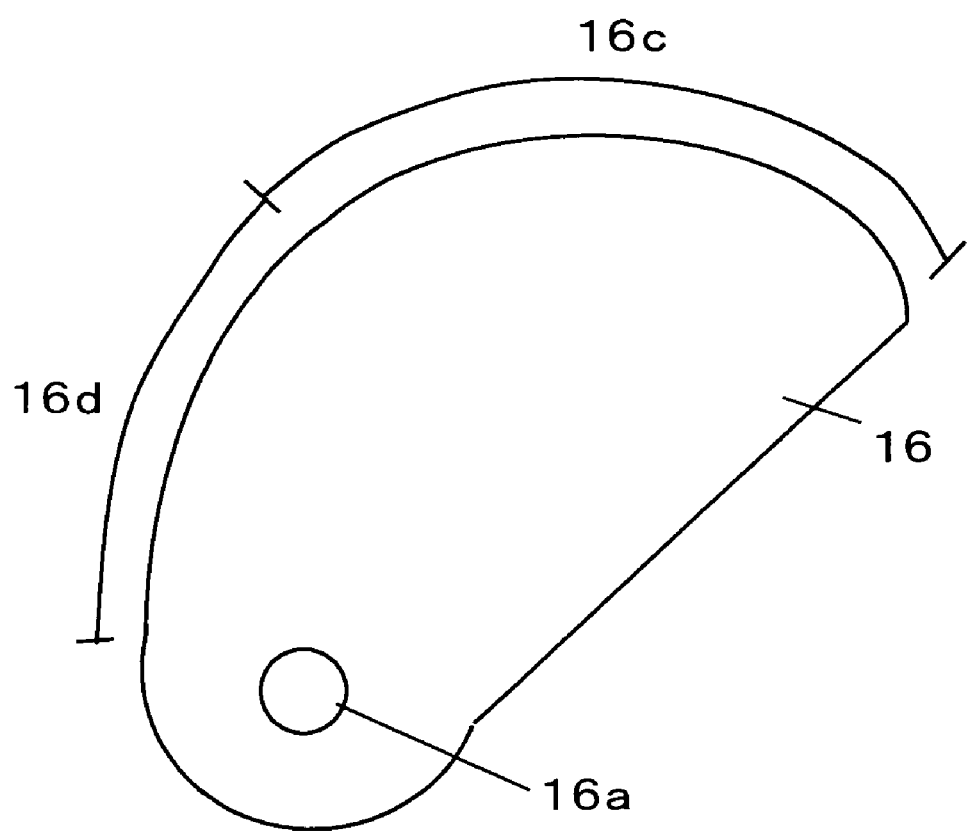

F I G. 4
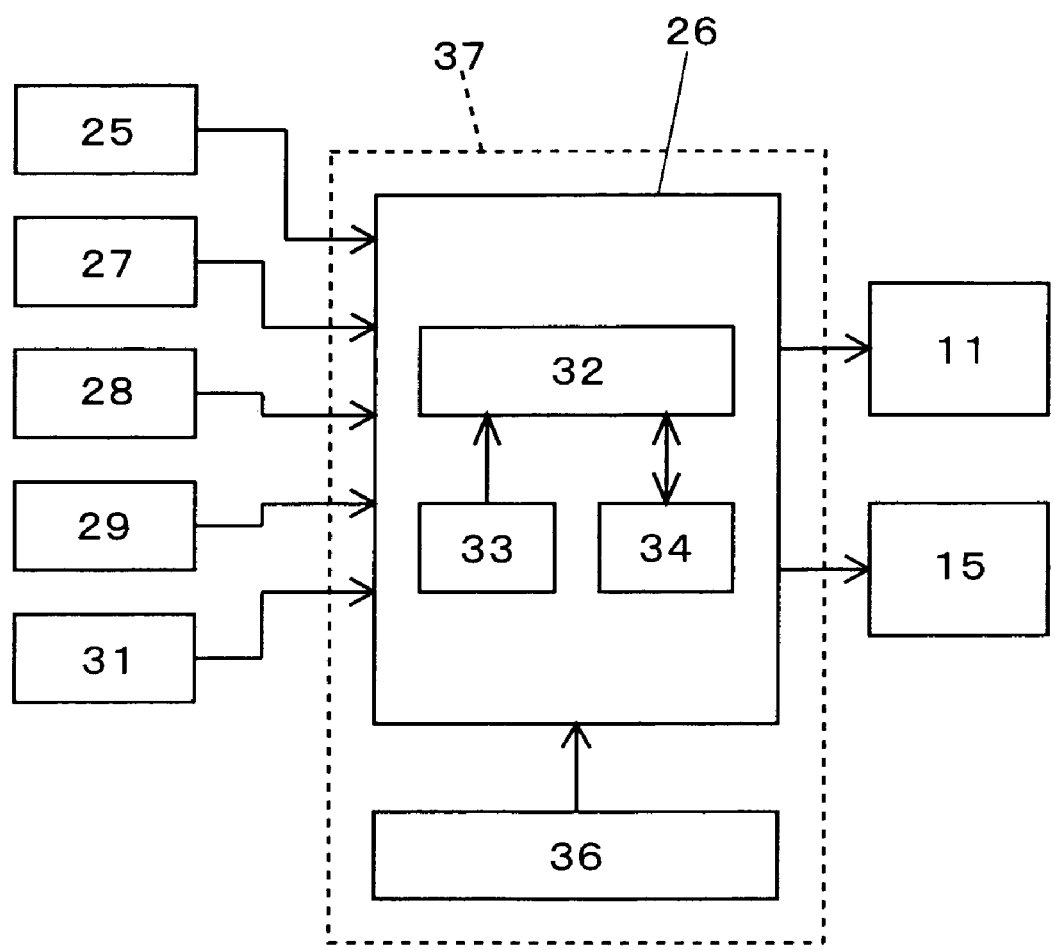

DISPLAY DEVICE FOR VEHICLES

TECHNICAL FIELD

This invention relates to a display unit for vehicles, and more particularly to a display unit for vehicles which is adapted to regulate an angular position of a member for reflecting display light emitted by a display.

BACKGROUND ART

There has heretofore been a head-up display unit (refer to FIG. 6) adapted to display a virtual image V by projecting display light L from a display unit 2 onto a windshield 1 of a vehicle. The display unit 2 houses (refer to FIG. 7) therein a display 3, such as a fluorescent display tube, a reflecting mirror 4 adapted to reflect display light L emitted by this display 3, and a stepping motor 5 for turning this reflecting mirror 4. A turning shaft of the stepping motor 5 is mounted with a gear 7, which is meshed with a gear portion 9 fixed to a retainer member 8 retaining the reflecting mirror 4.

A driver can regulate a direction in which the display light L is projected onto the windshield 1 by setting an angular position of the reflecting mirror 4 in a range of angle (for example, 6°) between an upper limit position and a lower limit position by his operation of a pushbutton switch (not shown). For example, when an angular position of the reflecting mirror 4 is set to a position in the vicinity of a lower limit position, the reflected display light can be advanced so as to enter the eyes of a driver D1 of a higher visual point. When an angular position of the reflecting mirror 4 is set to a position in the vicinity of a higher limit position, the reflected display light can be advanced so as to enter the eyes of a driver D2 of a lower visual point. In order to prevent a drawing from becoming complicated, the angular range between the upper limit position and lower limit position is shown on an enlarged scale in FIG. 8.

Even when an ignition switch is turned off in such a head-up display unit, the angular position of the reflecting member is maintained at a level set by the driver. Therefore, the sunlight is reflected on the reflecting mirror 4, and the display 3 is irradiated with the reflected sunlight to cause the display 3 to be deteriorated. There is a head-up display unit which is disclosed in JP-A-2002-137189 as a head-up display unit solving such a problem, and which is adapted to change an angular position of a reflecting mirror 4 so that the sunlight does not reflect toward a display 3 when an ignition switch is turned off.

It is desirable that, when the ignition switch is turned off in the head-up display unit disclosed in the above-mentioned publication, the angular position of the reflecting mirror 4 be returned to a predetermined original position. However, an angular movement of the reflecting mirror 4 is made usually for the purpose of regulating the direction in which the display light L is projected onto a windshield 1 by operating the above-mentioned pushbutton switch, so that the angular position of the reflecting mirror is moved at a comparatively low speed. Therefore, this head-up display unit had inconveniences of requiring time between the turning on of an ignition switch and the attainment of the original position of the reflecting mirror 4 during its returning movement thereto.

The present invention has been made in view of this problem, and aims at providing a display unit for vehicles which is capable of angularly moving such a reflecting member as is mentioned above to an original position in a comparatively short period of time even in the case where the reflecting member is angularly moved to a predetermined original position when an ignition switch is turned on.

DISCLOSURE OF THE INVENTION

The display unit for vehicles according to the present invention is provided with a display adapted to emit display light, a member for reflecting the display light, and a driving means for angularly moving the reflecting member at a first speed at a normal time or at a second speed higher than the first speed.

The display unit for vehicles according to the present invention is adapted to angularly move the reflecting member by the driving means to an angular position, in which the sunlight is not reflected on the display, when the ignition switch is turned off, and at the second speed to an original position, in which the display light is visible, when the ignition switch is turned on.

The display unit for vehicles according to the present invention is provided with a memory portion for storing an angular position of the reflecting member therein, the reflecting member being angularly moved when the ignition switch is turned on, by the driving means to the angular position stored as the original position in the memory portion.

The display unit for vehicles according to the present invention is provided on the driving means with a first speed controllable motor, and a control means for operating the first motor at a first speed or a second speed.

The display unit for vehicles according to the present invention is provided on the driving means with a second motor operated at a substantially constant speed, and a cam mechanism connected to the second motor, and having on an outer circumferential surface thereof a first moving portion for angularly moving the reflecting member at the first speed and a second moving portion for angularly moving the reflecting member at the second speed.

The display unit for vehicles according to the present invention is provided with a projecting portion connected to the reflecting member, the projecting portion being engaged with the cam mechanism and angularly moving the reflecting member.

The display unit for vehicles according to the present invention is provided on the projecting portion with a rotary member adapted to be turned along an outer circumferential surface of the cam mechanism and thereby angularly move the reflecting member.

BRIEF DESCRIPTION OF THE DRAWINGS

FIG. 3 is a drawing showing a cam mechanism in the same mode of embodiment;

FIG. 4 is a block diagram of a head-up display unit showing the same mode of embodiment;

BEST MODE FOR CARRYING OUT THE INVENTION

A mode of embodiment in which the present invention is applied to a head-up display unit will now be described on the basis of what are shown in the attached drawings.

Figure 1:
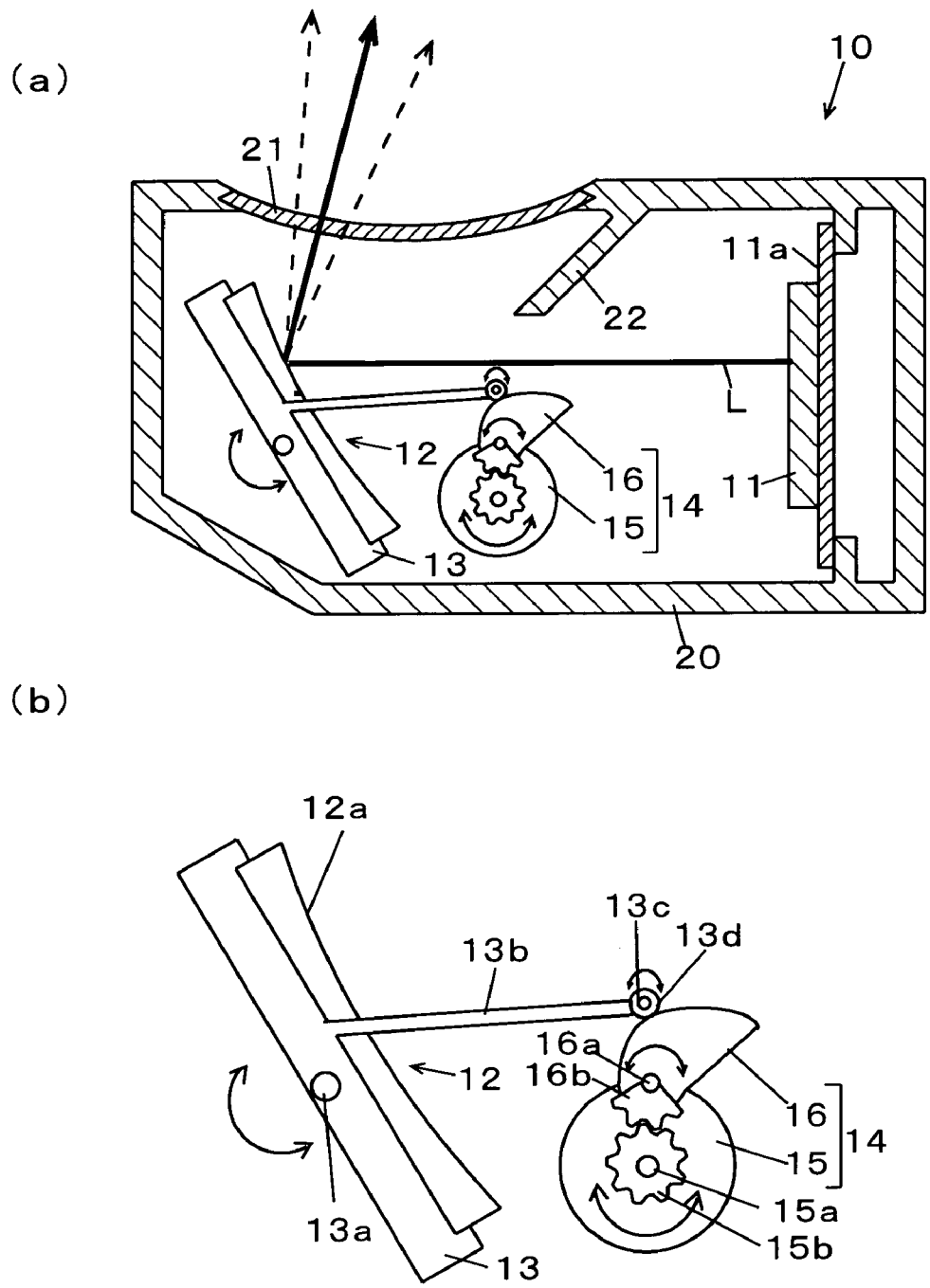
FIG. 1 is a sectional view of a display unit showing a mode of embodiment of the present invention.

FIG. 1(a) shows a display unit 10, which is provided on a dashboard of a vehicle. The display light L which the display unit projects is reflected on a windshield and advances toward a driver. The driver of the, vehicle can visually recognize a virtual image superposed on a landscape. The display unit 10 is provided with a display 11, a reflecting mirror (reflecting member) 12, a retainer member 13 and a driving means 14 in a housing 20.

The display 11 is a liquid crystal display including a TFT type liquid crystal display element and a back light means. The display 11 is provided on a rear surface thereof with a circuit board 11a for driving the display 11.

The reflecting mirror 12 is a member for reflecting display light L, which is emitted by the display 11, on a windshield. The reflecting mirror 12 is formed on a reflecting surface 12a by evaporating a metal, such as aluminum on a resin, such as polycarbonate. The reflecting surface 12a of the reflecting mirror 12 is concave, so that the display light L from the display 11 can be expanded and projected onto the windshield.

The retainer member 13 has the reflecting mirror 12 fixed thereto by a pressure sensitive adhesive double coated tape. The retainer member 13 is provided with a shaft portion 13a pivotably supported on a bearing portion (not shown) provided in the housing 20, and the reflecting mirror 12 and retainer member 13 are supported in an angularly movable state on the shaft portion 13a as a pivot. The retainer member 13 is provided with a lever portion (projecting portion) 13b formed so as to be engaged with a cam mechanism which will be described later. The lever portion 13b is provided at the section thereof which engages the cam mechanism with a roller portion (rotating member) 13d supported rotatably on a shaft portion 8c and made capable of lessening the friction of the roller portion with respect to the cam mechanism.

The driving means 14 includes a stepping motor 15 (second motor) for driving the reflecting mirror at a substantially constant speed, and a cam mechanism 16, and is adapted to angularly move the reflecting mirror 12 and retainer member 13 via the lever portion 13b. The stepping motor 15 and cam mechanism 16 are provided as shown in FIG. 1(b) with gear portions 15b, 16b made of a resin (for example, ABS) and mounted on their respective pivots 15a, 16a, the gear portions 15b, 16b being meshed with each other. Accordingly, the driving means 14 is formed so that, when the stepping motor 15 is operated, the cam mechanism 16 is rotated via the gear portions 15b, 16b, the reflecting mirror 12 (and retainer member 13) being thereby angularly moved via the lever portion 13b in accordance with the rotational movement of the cam mechanism 16.

Figure 2:
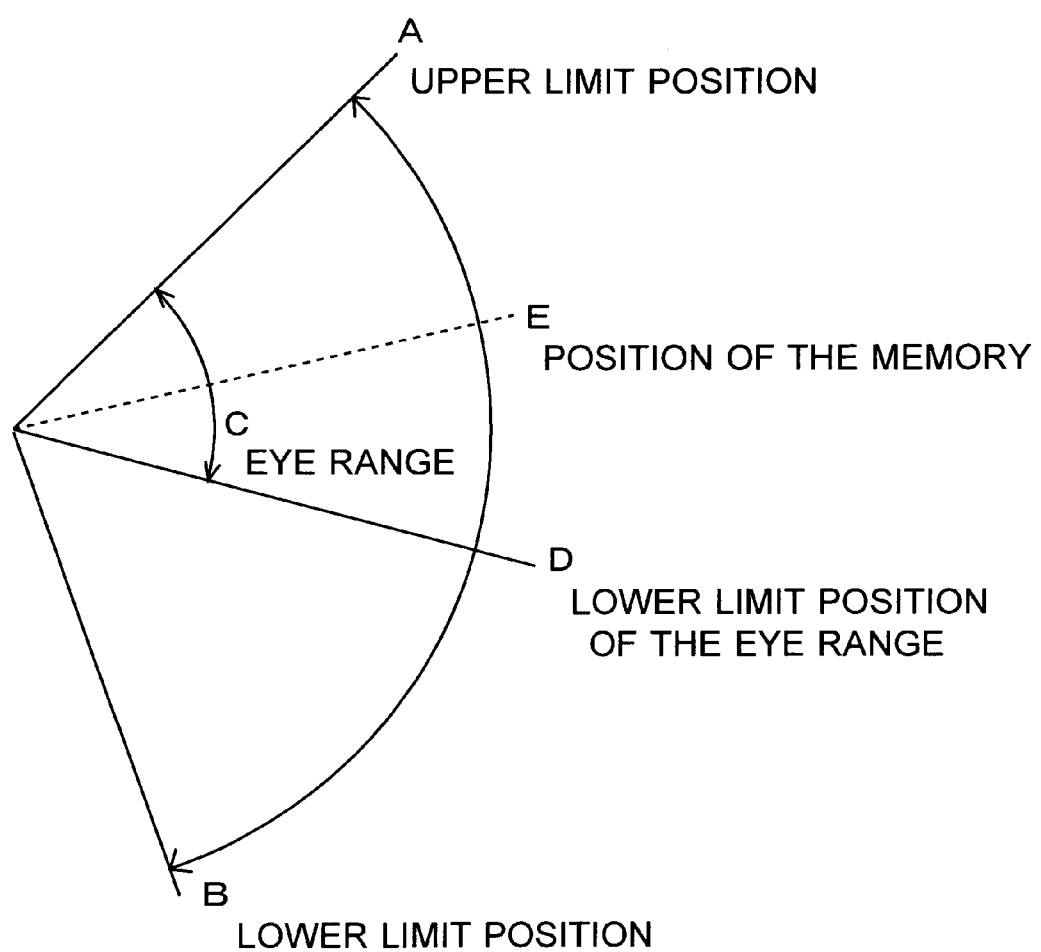
FIG. 2 is an explanatory view showing an angular movement of a reflecting mirror in the same mode of embodiment.

The driving means 14 is capable of regulating an angular position of the reflecting mirror 12 in a range of angle between an upper limit position A and a lower limit position B in accordance with an operation of a pushbutton switch, which will be described later, as shown in FIG. 2. The range of angle between the upper limit position A and lower limit position B is set suitably on the basis of an eye range C (visual region of a driver) and an angular position in which the reflecting mirror 12 does not reflect the sunlight toward the display 11. In this mode of embodiment, the lower limit position B shall be an angular position in which the reflecting mirror 12 does not reflect the sunlight toward the display 11. As shown in FIG. 3, the cam mechanism 16 is provided with a first moving portion 16c having a small variation in length between an outer circumferential surface of the cam mechanism 16 and the rotary shaft 16a with respect to an angular variation of the same cam mechanism, and a second moving portion 16d having a variation length between an outer circumferential surface of the cam mechanism 16 and the rotary shaft 16a with respect to an angular variation of the same cam mechanism which is larger than that of the first moving portion 16c. The cam mechanism 16 is formed so that, when the reflecting mirror 12 is angularly moved in the eye range C (in a normal case) by operating the pushbutton switch which will be described later, the first moving portion 16c thereof engages the lever portion 13b, and so that, when the reflecting mirror 12 is angularly moved in a range from a lower limit position D of the eye range to the lower limit position B, the second moving portion 16d engages the lever portion 13b. Namely, the driving means 14 angularly moves the reflecting mirror 12 at a comparatively low speed (which will hereinafter be referred to a first speed) at a normal time, and at a second speed higher than the first speed when the driving means angularly moves the reflecting mirror 12 in the range from the lower limit position D of the eye range to the lower limit position B.

The housing 20 holds therein the display 11, reflecting mirror 12, retainer member 13, driving means 14, and the like. The housing 20 is provided with a translucent cover 21 through which the display light L passes. The translucent cover 21 is formed out of a translucent resin, such as an acrylic resin, and has a cross-sectionally curved shape. A reference numeral 22 denotes a light shielding wall, which is formed so as to be integral with the housing 20 and works to prevent the occurrence of a phenomenon (washout) in which the external light, such as the sunlight enters the display 11 to cause a virtual image to become difficult to be seen.

FIG. 4 is a block diagram showing the electrical construction of the head-up display unit. Such a head-up display unit includes mainly a speed sensor 25, a microcomputer 26, pushbutton switches 27, 28, a memory switch 29, a display 11 and a stepping motor 15.

The speed sensor 25 is adapted to detect a speed of a vehicle, and output a speed signal to the microcomputer 16. The pushbutton switches 27, 28 output a switch operating signal to the microcomputer 26, by which the rotary shaft of the stepping motor 15 is turned, the reflecting mirror 12 being thereby angularly moved. When the pushbutton switch 27 is turned on, the reflecting mirror 12 is moved angularly in the downward direction, and, when the pushbutton switch 28 is turned on, the reflecting mirror 12 is moved angularly in the upward direction.

The memory switch 29 is adapted to output a switch operating signal to the microcomputer 26. When the memory switch 29 continues to be on for not shorter than 0.5 seconds, the microcomputer 26 stores data on the angular position of the reflecting mirror 12 at the actual point in time in EEPROM which will be described later. Namely, when the memory switch 29 is pressed continuously for not shorter than 0.5 seconds, the angular position (which will hereinafter be referred to as a memory position E) of the reflecting mirror at the actual point in time is stored.

The microcomputer 26 has CPU 32, ROM 33 and RAM 34, carries out a predetermined computation process on the basis of a speed signal, and shows a speed on the display 11. The microcomputer 26 forms a control unit 37 with the EEPROM 36 (memory portion). The EEPROM 36 stores therein the data on the angular position memorized by operating the memory switch 29. This data on the angular position represents the number of steps from the lower limit position B to a memory position E.

The microcomputer 26 drives the stepping motor 15 in accordance with the inputting thereinto of the above-mentioned switch operating signals from the pushbutton switches 27, 28, angularly moves the reflecting mirror 12 by the driving means 14 in the eye range C and thereby regulates the angular position of the reflecting mirror. Since the first moving portion 16c of the cam mechanism 16 is engaged with the lever portion 13b during this time in which the reflecting mirror is in the eye range C, the reflecting mirror 12 is angularly moved at the first speed.

The microcomputer 26 receives an ignition-state signal, which indicates one of the positions OFF, ACC, ON in which the ignition switch 31 exists, from the ignition switch 31, drives the stepping motor 15 when the ignition switch 31 is turned off, and angularly moves the reflecting mirror 12 to the lower limit position B by the driving means 14. When the reflecting mirror is in the eye range C during this time, the reflecting mirror is angularly moved at the first speed. When the reflecting mirror 12 is in the range from the lower limit position D of the eye range to the lower limit position B during the same time, the reflecting mirror 12 is moved at the second speed since the second moving portion 16d of the cam mechanism 16 is engaged with the lever portion 13b.

The microcomputer 26 drives the stepping motor 15 when the ignition switch 31 is turned on, and angularly moves the reflecting mirror 12 from the lower limit position B to the position E of the memory by the driving means 14. When the reflecting mirror 12 is in the range from the lower limit position B to the lower limit position D of the eye range during this time, the reflecting mirror 12 is angularly moved at the second speed. When the reflecting mirror 12 is in the range from the lower limit position D of the eye range to the position E of the memory, the reflecting mirror 12 is angularly moved at the first speed. The time "when the ignition switch 31 is turned off," includes not only the time at which the ignition switch 31 changes from ON to ACC but also the time at which the ignition switch 31 changes from ACC to OFF. The time "when the ignition switch 31 is turned off," includes not only the time at which the ignition switch 31 changes from ACC to ON but also the time at which the ignition switch changes from OFF to ACC. The angular position to which the reflecting mirror 12 is angularly moved when the ignition switch 31 is turned on may not be the position E of the memory, and this angular position may be, for example, an intermediate position in the eye range C.

Figure 5:
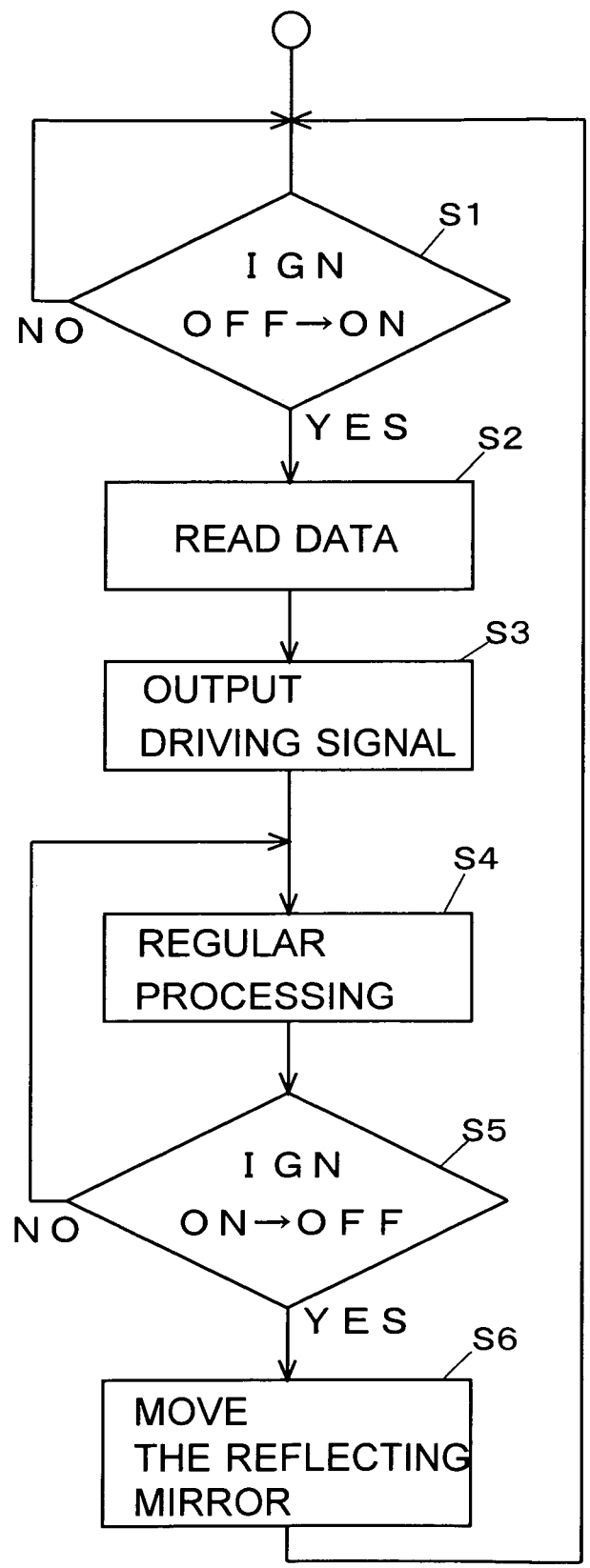
FIG. 5 is a flow chart showing an angular movement of the reflecting mirror in the same mode of embodiment.
Figure 6:
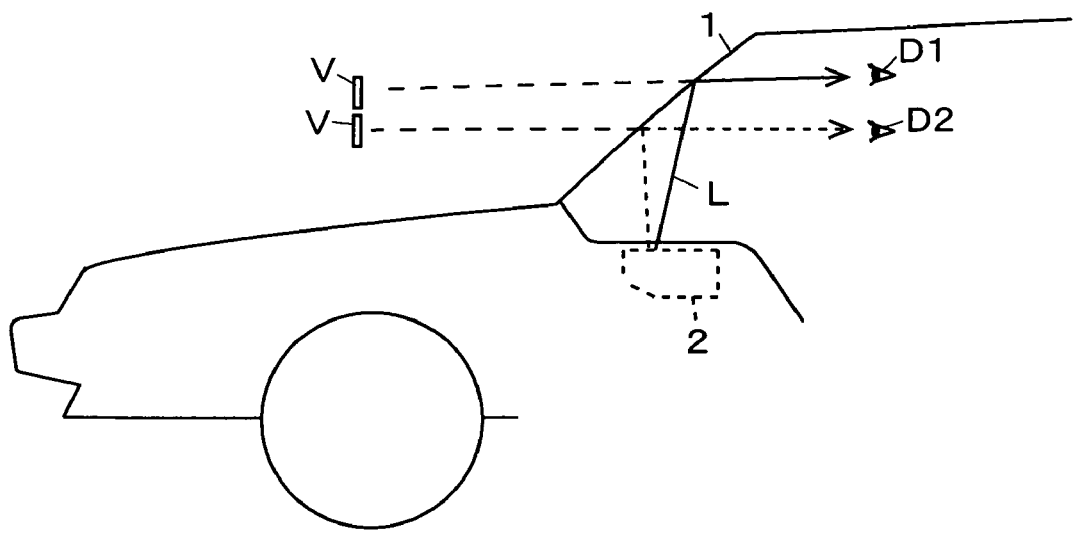
FIG. 6 is a schematic construction diagram of a head-up display showing a related art example.
Figure 7:
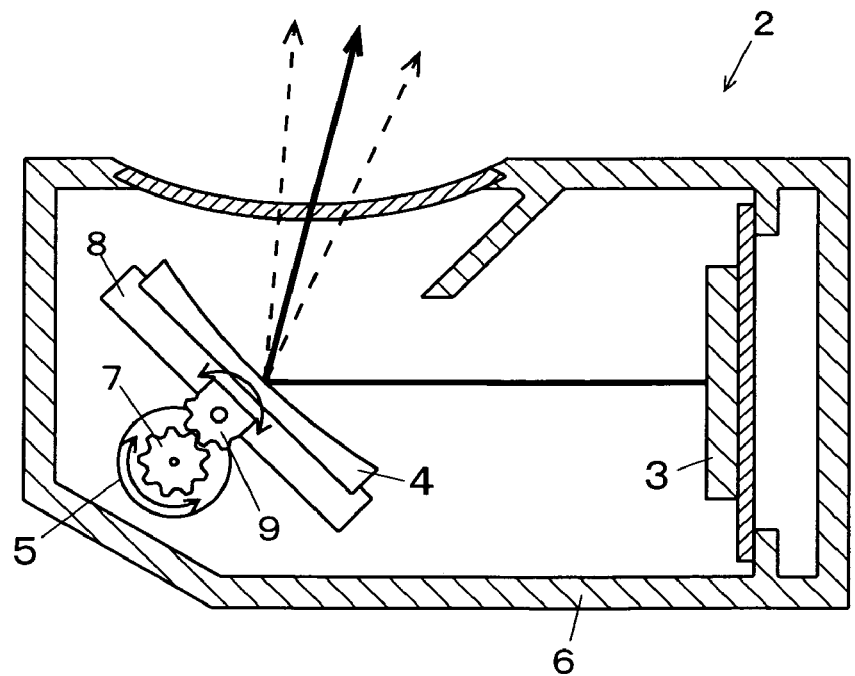
FIG. 7 is a sectional view of a display unit showing the same related art example.
Figure 8:
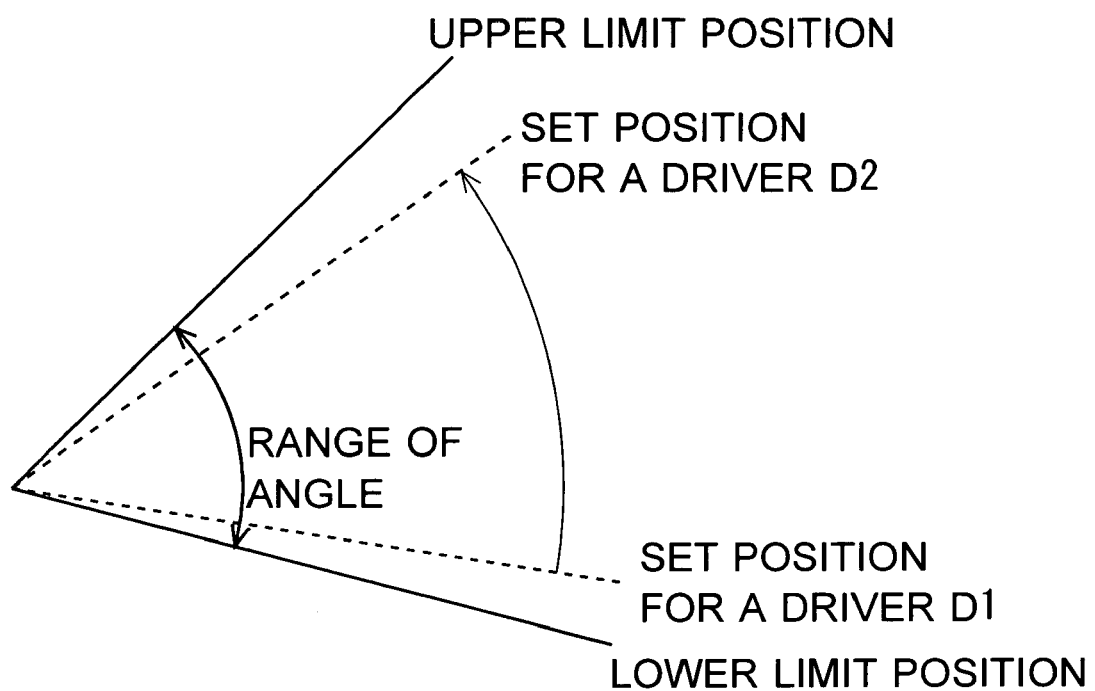
FIG. 8 is an explanatory drawing showing an angular movement of a reflecting mirror in the same related art example.

The angular movement of the reflecting mirror 12 will now be described in detail on the basis of a flow chart shown in FIG. 5.

The microcomputer 26 monitors the ignition switch 31 as to whether the ignition switch 31 is turned on (Step S1), and reads the stored data on the angular position from EEPROM 36 when the ignition switch 31 is turned on (Step S2). Then, in Step S3, a driving signal is outputted to the stepping motor 15 on the basis of the read data on the angular position, and the reflecting mirror 12 set in the lower limit position B by the driving means 14 is angularly moved to the position E of the memory. After the process of Step S3 finishes, the microcomputer 26 carries out a regular process, such as a speed displaying process (Step S4). When the ignition switch 31 is off (Step S5), a driving signal is outputted to the stepping motor 15, and the reflecting mirror 12 is angularly moved to the lower limit position B (Step S6).

In this mode of embodiment, the reflecting mirror 12 can be angularly moved at a speed higher than that employed at a normal time as necessary by angularly moving the same reflecting mirror 12 by the driving means 14 at the first speed employed at a normal time or at the second speed higher than the first speed, so that the moving time of the reflecting mirror to the position of a predetermined angle can be reduced to a comparatively low level.

When the ignition switch 31 is turned on, the reflecting mirror 12 existing in the lower limit position B is angularly moved to the position E of the memory, i.e. the original position at the second speed higher than the first speed employed at a normal time, in the range from the lower limit position B to the lower limit position D of the eye range. Accordingly, in order to restart the operation of a vehicle, it becomes possible to reduce to a comparatively low level the time required to angularly move the reflecting mirror 12 to the original position.

The EEPROM 36 for storing the angular position of the reflecting mirror 12 therein and memory switch 29 for storing the same angular position in the EEPROM 36 are provided, and the driving means 14 angularly moves the reflecting mirror 12 to the position E of the memory as the original position when the ignition switch 31 is turned on. Accordingly, it becomes possible that the driver restarts the operation of the vehicle in an angular position which suits his own visual point.

The driving means 14 includes the stepping motor 15 operated at a substantially constant speed, and a cam mechanism 16 connected to the stepping motor 15 and having on an outer circumferential surface thereof the first moving portion 16c for angularly moving the reflecting mirror 12 at the first speed and the second moving portion 16d for angularly moving the reflecting mirror 12 at the second speed. Accordingly, it becomes possible that the reflecting mirror moving speed can be switched to the first speed or the second speed depending upon the shape of the portions of the outer circumferential surface of the cam mechanism 16. This enables the time required to angularly move the reflecting mirror 12 to the original position to be reduced to a comparatively low level owing to the easily-formable, inexpensive structure.

The lever portion 13b projecting toward the cam mechanism 16 is formed on the retainer member 13 retaining the reflecting mirror 12 on the cam mechanism 16, and engaged with the same cam mechanism 16. Accordingly, it becomes possible to angularly move the reflecting mirror 12 in accordance with a rotational movement of the cam mechanism 16.

Since the lever portion 13b is provided with the roller portion 13d turning along the outer circumferential surface of the cam mechanism 16 and thereby angularly moving the reflecting mirror 12, it becomes possible that the friction of the section of the lever portion which engages the cam mechanism 16 with respect thereto be lessened, and that the angular movement of the reflecting mirror 12 be made stably.

In this mode of embodiment, the driving means 14 is made of the stepping motor 15 and cam mechanism 16, and the reflecting mirror 12 is angularly moved at the first speed or second speed by the first and second moving portions 16c, 16d formed on the outer circumferential surface of the cam mechanism 16. The driving means may also be formed by providing a speed controllable motor (first motor), and a control means including, for example, a microcomputer for operating this motor at a first speed employed at a normal time or at a second speed higher than the first speed and a driver, and adapted to angularly move the reflecting member at the first speed or the second speed by controlling the speed of the motor by the control means. This enables the time required to move the reflecting member to a predetermined angular position to be reduced to a comparatively low level.

The display in this mode of embodiment is the display 11, which may also be made of, for example, a fluorescent display tube and an organic EL display panel. The memory portion in this embodiment is the EEPROM 36, which may also be made of, for example, a flash memory.

In this mode of embodiment, only one data on the angular position of the reflecting mirror 12 is stored. The data on the angular position of the reflecting mirror may also be stored plurally so that the positions of the memory of not smaller than two drivers can be stored. Although this mode of embodiment is a head-up display unit, this display unit can be applied to, for example, a virtual image display type combination meter.

INDUSTRIAL APPLICABILITY

The present invention can be applied to a display unit for vehicles, and preferably to a display unit for vehicles, used to regulate the angular position of, especially, a member for reflecting the display light emitted by a display.

The invention claimed is:

1. A display unit for vehicles, characterized in that the display unit is provided with a display adapted to emit display light, a member adapted to reflect the display light, and a driving means for angularly moving the reflecting member selectively between a first speed employed at a normal time, and a second speed higher than the first speed.

2. A display unit for vehicles according to claim 1, wherein the driving means angularly moves the reflecting member to an angular position, in which the sunlight is not reflected toward the display, when an ignition switch is turned off, and at the second speed to an original position, in which the display light can be visually recognized, when the ignition switch is turned on.

3. A display unit for vehicles according to claim 2, wherein the display unit is provided with a memory portion for storing the angular position of the reflecting member, the driving means angularly moving the reflecting member to the angular position, which is stored as the original position in the memory portion, when the ignition switch is turned on.

4. A display unit for vehicles according to any one of claims 1 to 3, wherein the driving means is provided with a first speed controllable motor, and a control means for operating the first motor selectively between the first speed and the second speed.

5. A display unit for vehicles according to any one of claims 1 to 3, wherein the driving means is provided with a second motor operated at a substantially constant speed, and a cam mechanism connected to the second motor and having on an outer circumferential surface thereof a first moving portion for angularly moving the reflecting member at the first speed and a second moving portion for angularly moving the reflecting member at the second speed.

6. A display unit for vehicles according to claim 5, wherein the reflecting member is provided with a projecting portion connected thereto, the reflecting member being angularly moved with the projecting portion engaged with the cam mechanism.

7. A display unit for vehicles according to claim 6, wherein the projecting portion is provided with a rolling member turned along the outer circumferential surface of the cam mechanism and thereby angularly moving the reflecting member.

* * * * *

UNITED STATES PATENT AND TRADEMARK OFFICE
CERTIFICATE OF CORRECTION

| | |
|---|---|
| PATENT NO. | : 7,333,269 B2 |
| APPLICATION NO. | : 10/525845 |
| DATED | : February 19, 2008 |
| INVENTOR(S) | : Hiroshi Shiobara et al. |

It is certified that error appears in the above-identified patent and that said Letters Patent is hereby corrected as shown below:

Title Page

In Item "(73) Assignee", change "Nippon Seiko Co., Ltd." to --Nippon Seiki Co., Ltd.--.

Signed and Sealed this

Twenty-sixth Day of August, 2008

JON W. DUDAS
*Director of the United States Patent and Trademark Office*